Oct. 30, 1962  K. E. WAGGENER  3,061,336
SAFETY JOINT CONNECTOR

Original Filed Aug. 21, 1956  2 Sheets-Sheet 1

INVENTOR.
KENNETH E. WAGGENER
BY
Mellin and Hanscom
ATTORNEYS

Oct. 30, 1962 K. E. WAGGENER 3,061,336
SAFETY JOINT CONNECTOR
Original Filed Aug. 21, 1956 2 Sheets-Sheet 2
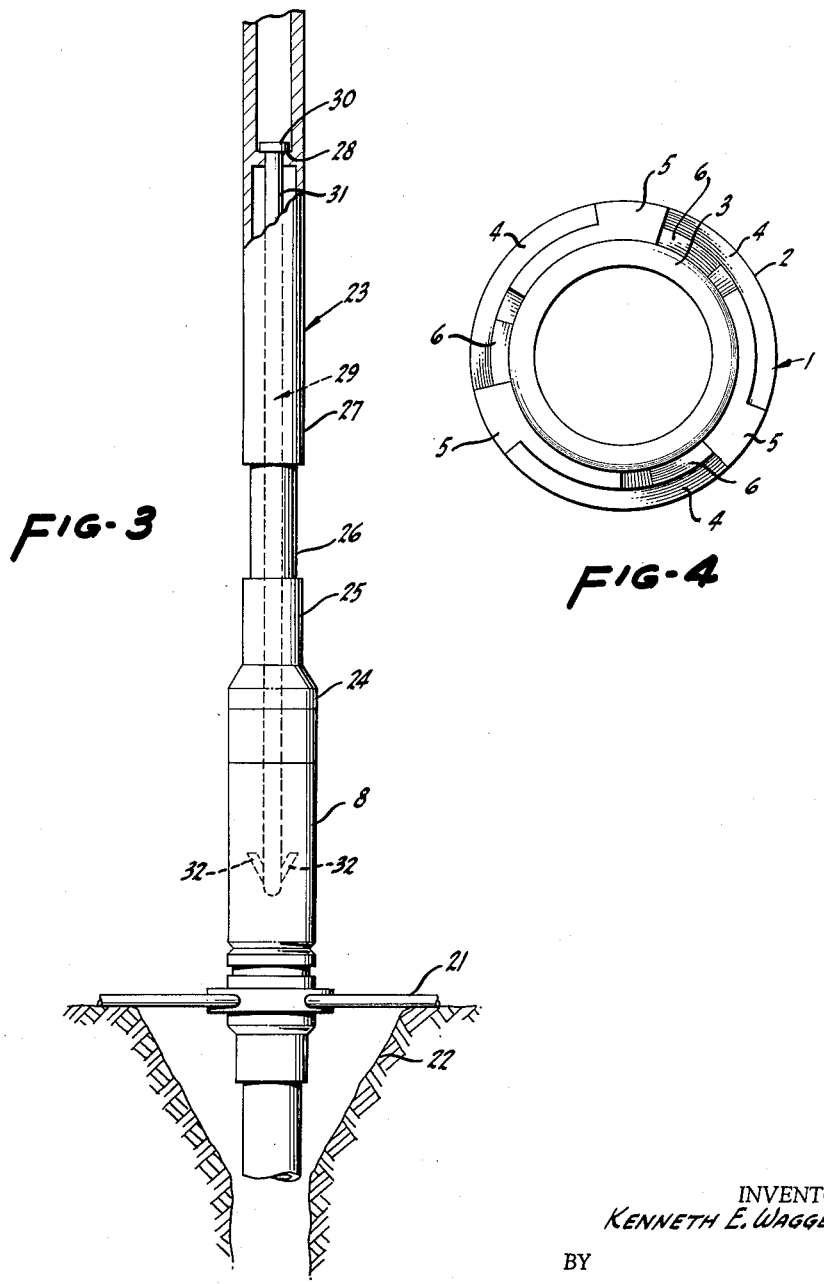
INVENTOR.
KENNETH E. WAGGENER
BY
Mellin and Hanscom
ATTORNEYS

United States Patent Office 3,061,336
Patented Oct. 30, 1962

3,061,336
SAFETY JOINT CONNECTOR
Kenneth E. Waggener, Brea, Calif., assignor of one-third to Ross A. McClintock, Orange, Calif., and one-third to Raymond E. Thompson, Fullerton, Calif.
Continuation of application Ser. No. 605,241, Aug. 21, 1956. This application Sept. 29, 1958, Ser. No. 763,872
13 Claims. (Cl. 285—84)

This invention relates generally to connectors for pipes, tubing, and the like, and relates more particularly to a novel and inventive safety tool joint for use with well drilling equipment.

This application is a continuation of patent application Serial Number 605,241, filed August 21, 1956, now abandoned.

In the well drilling industry, it is common practice to employ a drilling string for boring by the rotary method. Sections of drill pipe are coupled together by tool joints to form the drilling string which carries a drilling tool on the distended end. At certain times during the drilling operation, it becomes necessary or desirable to detach and later connect a particular section of pipe in the string, and since the tool joint which connects this section may be located at a remote point, it is particularly desirable to employ a connector which may be released from an operational position.

For example, in one type of off-shore drilling, it is essential to be able to rapidly dissassemble a subsurface connection in emergencies such as an impending storm. Since the coupling is remote from the surface operation, this particular tool joint must be capable of immediate release from above, and a safety joint connector services this need.

Safety joints are also employed for connecting the drilling tool to the end of the string. If the tool becomes jammed or stuck so that it cannot be pulled or raised, the upper part of the string may be recovered by detaching it from the frozen tool. Of course, the safety joint may be used at any part of the string where remote detachments may become necessary.

Although basically a safety tool joint, this invention is entirely unlike any other safety joint heretofore available in the oil tool industry. As illustrated and described below, this tool joint is inherently simple in construction, yet it embodies unique structural features found in no other connector device. This tool joint not only may be released from remote operational positions, but the sections may be reassembled by mere axial alignment and relative telescopic movement. Once connected, the two sections will not separate under any combination of vertical or axial loads.

Therefore, it is one object of this invention to provide a safety tool joint that may be easily and quickly connected and disassembled from remote points of operation. This result not only saves time and expense in operation, but it makes the tool joint especially suitable for use in well drilling strings.

A second object is to provide a tool joint connector which may be assembled from a remote operational position by merely telescoping the connector parts. In a well drilling application, the weight of the drilling string alone is usually sufficient to effect a connection.

Another object of this invention is to provide a novel tool joint for use in a drilling string. The sections of this tool joint cannot be separated by any combination of rotational and axial loads applied to the string, but properly controlled from the surface operation this tool joint can be expeditiously disassembled and reconnected.

A further object of this invention is to provide a special subassembly and retracting tool to be used in unlocking and disassembling the sections of the novel tool joint. These devices are of particular value in effecting the release of a remote tool joint in a drilling string.

A still further object of this invention is to provide a safety type tool joint which is relatively simple in construction but sturdy and dependable in performance; one which provides a continuous liquid-tight flow path through the tool joint.

Other objects and advantages of the invention will be suggested by the description and drawings. After considering the embodiment described herein, persons skilled in the art will understand that variations may be made without departing from the principles disclosed; and, the use of any structures or arrangements that are properly within the scope of the appended claims is contemplated.

Referring to the drawings:

FIG. 3 is an elevation view of a portion of a drilling string used in off-shore drilling wherein the safety joint of FIGS. 1 and 2 is utilized in combination with an extensible conduit; a retracting tool for effecting a release of the locking mechanism is shown as used therewith;

FIG. 4 is a top plan view of the mandrel of FIG. 1;

General Description

Figures 1, 2, 5:
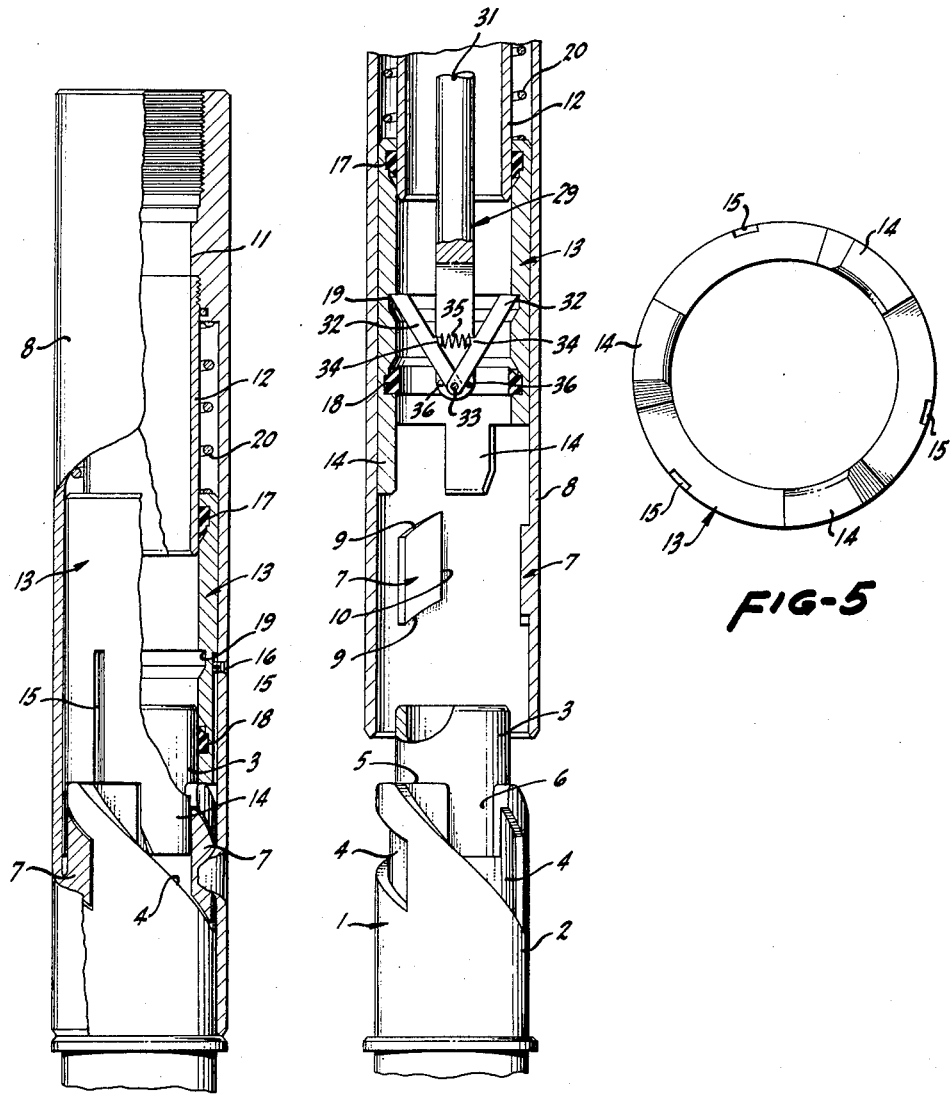
FIG. 1 is a side view of the two conduit portions of a tool joint which embodies this invention, the mandrel being shown in elevation and mating portions of the barrel assembly being shown in longitudinal section, said barrel assembly being separated from the mandrel.
FIG. 2 is a second side view of the tool joint of FIG. 1, but with the mandrel and barrel assembled; portions of the barrel and key sleeve are shown partly in section.
FIG. 5 is a bottom plan view of the key sleeve of FIG. 1.

The new and inventive tool joint described herein essentially comprises a pair of tubular conduit pipe sections, one of which is telescopically received in the other. The outer surface of the inner conduit and the inner surface of the outer conduit are provided with mating camming means which consists of a helical recess in one surface and camming lugs on the other. A key sleeve is disposed in the tool joint, and it carries a plurality of key appendages which mate with surface grooves for locking the conduit sections together after they have been joined. In addition, the tool joint illustrated is provided with a resilient biasing means which engages the key sleeve and urges it into a locking position as shown in FIG. 2. When the key sleeve is retracted against the biasing means, by means herein described, it occupies a releasing position as shown in FIG. 1.

The two sections of the tool joint may be formed integrally with a pipe section but preferably are manufactured separately and then rigidly connected to respective ends of pipe sections or other fittings. These connections may be made by welding or the like, including any suitable tool joint known in the connector art.

Specific Description

Referring more particularly to FIG. 1 of the drawings, there is illustrated one embodiment of the invention now to be described. It will be noted that the inner conduit section or mandrel 1 comprises a base portion 2 and a reduced diameter sleeve extension 3. Base 2 is formed with a camming means comprising one or more helical grooves or camming recesses 4. Each of these grooves begins at shoulder 5, where base 2 and sleeve 3 join, and extends convolutely a predetermined distance about the base.

Base 2 is also provided with one or more axial grooves 6 formed in its outer surface. Beginning at shoulder 5, each groove extends axially a predetermined distance until it intersects one of the camming recesses 4. Each helical groove recess extends beyond this intersection to provide a seating space for a cooperating camming lug 7 to be attached to the inner surface of the outer conduit.

While any number of camming grooves may be utilized, each groove is intersected by an axial groove as described. The mandrel illustrated has three helical grooves and three axial grooves, each groove spaced at regular intervals (or every 120°). It is important that a symmetrical arrangement be selected so that each of the camming lugs 7 can mate with any one of the helical camming recesses and such that all of the lugs will mate simultaneously with the helical grooves.

The outer conduit section or tubular barrel 8 forms the second half of the tool joint and, as previously noted, is provided with a camming means comprising one or more camming lugs 7 on its inner cylindrical surface. The lugs are preferably made with a helical shape providing camming surfaces 9 which will mate with the sides of the helical grooves. The number of lugs provided will equal the number of helical grooves, and are spaced annularly for simultaneous and cooperative mating with the helical grooves.

From the above description, it will be noted that if the lugs are aligned with an opening to a helical groove at the shoulder 5, and if the mandrel and barrel are brought axially together, lugs 7 will pass into the grooves until the most advanced surface 9 of each lug will abut against the side of an axial groove. If three helical grooves are utilized as shown, only a slight rotation of the barrel (if any) will be required to put the lugs in alignment with the openings to the helical grooves. Because of the inclined contours of the mating surfaces, there is effected a relative rotation of the barrel unit and a simultaneous telescoping of parts until the lugs seat themselves against the ends of the recesses. The size of the helical grooves and lugs will be determined such that when the lugs are seated at the ends of the recesses, the trailing axial edge 10 of each lug will clear the respective axial groove which intersects its recess.

Barrel 8 has an inner reduced conduit portion 11 from which an inner conduit sleeve 12 extends coaxially with the barrel. Sleeve 12 may be threadedly attached to the reduced conduit portion, as shown. The inner diameter of the sleeve is the same as the fitting to which it is connected and provides a smooth continuous path to the inner regions of the barrel assembly. The outer diameter of sleeve 12 is approximately the same as that of extension sleeve 3.

A key sleeve 13 is housed in the barrel 8 between lugs 7 and the inner reduced conduit portion 11, and is mounted therein for relative reciprocal movement. The sleeve is provided with a plurality of key appendages 14, the same in number as axial grooves provided in the mandrel. As shown, these keys extend axially from the end of the sleeve closest to base 2 and are disposed annularly about the sleeve and at uniformly spaced distances for cooperative engagement with the axial grooves. The ends of the keys may be beveled to facilitate entry into the axial grooves and to aid in effecting a coupling of the tool joint.

The outer surface of the key sleeve is axially splined in one or more places 15 so as to receive one or more setscrews 16 in the barrel 8. These axial splines and cooperating setscrews provide a means to prevent rotation of the sleeve in the barrel but allow limited axial movement therein.

The inner diameter of the key sleeve is slightly larger than the outer diameters of the inner conduit sleeve 12 and sleeve extension 3. Sealing means 17 and 18 are provided at the ends of the key sleeve on its inner surface. These sealing means cooperate, respectively, with the outer surfaces of sleeves 12 and 3 to provide liquid-tight communication through the key sleeve when the joint is assembled as shown in FIG. 2.

An annular recess 19 is formed on the inner surface of the key sleeve to provide a footing for a retracting tool. This recess is shaped to catch the lip of a tool which may be inserted through either end of the tool joint. However, in connection with this embodiment a special retracting tool and subassembly may be utilized as hereinafter described.

A resilient biasing means is disposed in the barrel to urge the key sleeve toward the mandrel. For this purpose, a coil spring 20 is seated in abutment with the reduced conduit portion of the barrel. The other end of the coil spring rests against the inner end of the key sleeve and the coils, themselves, circumvallate the inner conduit sleeve 12. In the normally uncoupled position, the outer end of the key sleeve is forced into engagement with the lugs 7 on the barrel. The lugs thereby prevent further axial movement of the key sleeve while the coil spring is yet in partial compression.

A connection between barrel 8 and mandrel 1 is made simply by bringing the two parts axially together. The sleeve extension 3 will enter the barrel unobstructed until lugs 7 abut the shoulder 5 at an ungrooved portion of the base 2. A slight rotation of the barrel will permit the camming lugs to engage the openings to grooves 4 and move axially therein until the lower surfaces 9 of the lugs engage the lower edge of the camming recesses. Since the lugs and recesses are inclined, a slight axial pressure on the barrel assembly (or the weight of a drilling string alone) will simultaneously telescope and rotate the lugs into their respective recesses. While the lugs are being received and the barrel advances onto the mandrel, the key sleeve 13 is forced into a retracted position by abutment of the key appendages 14 against the shoulder 5. When the barrel assembly is fully rotated to the position where the lugs are seated in the furthermost part of their recesses, keys 14 will then arrive at a position of alignment with the axial grooves 6. Under the pressure applied by the resilient biasing means 20, the key sleeve will move forward, carrying the keys into a locking position.

It may be noted that if the key appendages are beveled at their ends as previously described, they will tend to enter the axial grooves prior to complete alignment. This will produce an effective camming action which will aid in rotating the parts into a locking position.

Once the joint is assembled, no combination of axial or rotational forces upon either the barrel or the mandrel can effectuate a disconnection until the key appendages are retracted from their axial grooves. It was noted that an annular recess 19 is provided on the key sleeve and may be reached by a retracting tool through either the mandrel or the barrel. However, a special retracting tool and subassembly may be utilized which is of particular value in a well drilling application.

FIG. 3 illustrates a portion of a string used in off-shore drilling wherein a safety joint embodying the invention of FIGS. 1 and 2 has been incorporated. A spider 21 is secured to the upper end of the drill string and rests on the surface of the earth formation 22 to limit the depth to which the string section is drilled. Directly above the spider is the safety joint of this invention having the barrel section 8 surmounting and engaged with its mandrel. Connected to the upper end of barrel 8 is a means 23 for extending a retracting tool a predetermined distance into the tool joint, such a retracting tool being shown in its operating position.

The means 23 comprises a bumper sub or extensible conduit connected to the surface controlled portion of the drilling string and a crossover sub 24 which is attached to barrel 8 of the tool joint. The extensible conduit consists of a tubular mandrel 25 having a reduced diameter portion 26 and a tubular barrel 27 telescopically receiving said reduced diameter portion. A splined connection is provided between portions of the barrel 27 and the mandrel portion 26, thus permitting relative axial movement but transmitting rotary movement of the barrel to the mandrel 25.

Barrel 27 is provided with an internal shoulder 28 on its inner cylindrical surface, said shoulder serving as a seat for a retracting tool 29, as illustrated. No section of the drilling string will possess an internal restriction as small as the shoulder 28 and, therefore, a retracting tool may be lowered by gravity until its head 30 rests upon this shoulder.

The retracting tool comprises a rod portion 31 which is extended into the tool joint. At the distended end of the rod a pair of arms 32 is pivoted on a pin 33. The arms are provided with spring retaining lugs 34 in opposed facing relationship, and a coil spring 35, which is supported between these lugs urges the ends of the arms 32 outwardly. The outward movement of the arms is limited by pins 36 disposed on the rod at opposite sides of the pivot pin.

When the tool is inserted into the string, the upper ends of the arms 32 engage the interior walls of the bore and are moved inwardly against the force of spring 35. The weight of the rod (or other means) will carry the rod through the drilling string until the head 30 seats upon the obstructing shoulder 28. The length of the rod is such that when the extensible conduit is fully telescoped, the upper ends of arms 32 are below the annular recess 19 of the key sleeve. The string is then pulled upwardly to raise and extend the barrel 27 on the mandrel 25, as shown in FIG. 3, thereby causing a like movement of the retracting tool. As the tool moves upwardly, the arms engage recess 19, and further movement of the string will retract the key sleeve against the force of the biasing means until the keys 14 are pulled from the axial grooves. With the connector assembly now unlocked, additional movement of the string will cause the lugs of barrel 8 to engage the upper inclined surfaces of the helical grooves 4, thus imparting rotation to the barrel assembly while simultaneously being extended from the mandrel. The upper free end of the string may then be raised and the retracting tool removed.

Although there is described and illustrated a preferred embodiment of this invention, it will be understood that the invention is not limited thereto but may be otherwise embodied or practiced within the scope of my claims.

Having thus described my invention, what I claim and desire to secure by Letters Patent is:

1. In a joint for coupling pipe sections and the like, comprising two tubular conduit sections, one conduit section being smaller than the other conduit and having an outer cylindrical surface slightly smaller than the inner cylindrical surface of the other; camming lugs disposed on one of said surfaces and helical camming recesses formed on the other of said surfaces; whereby said lugs and recesses engage upon telescoping of said conduit sections and produce a relative helical movement between said conduits; axial grooves provided in said surface of said smaller conduit; a tubular key sleeve mounted in said larger conduit for relative axial movement, said key sleeve provided with key appendages extending axially from the end of said sleeve nearest said smaller conduit and disposed for cooperatively engaging said axial grooves; spring means seated in said larger conduit and abutting the other end of said sleeve to bias said sleeve toward said smaller conduit, said sleeve being free to move axially in said larger conduit against the bias of said spring means upon axial engagement of said key appendages with said smaller conduit adjacent said axial grooves; and means engaging said key sleeve and preventing relative rotation between sleeve and said larger conduit portion.

2. In a joint for coupling pipe sections and the like, a tubular barrel provided with a camming means on its inner cylindrical surface; a tubular mandrel provided with camming means formed on its outer cylindrical surface for engaging said barrel camming means and producing helical movement thereof about said mandrel; axial grooves provided on one of said surfaces and connecting with the respective camming means; a tubular key sleeve mounted in said barrel for relative axial movement, said key sleeve provided with key appendages extending axially from the end of said sleeve nearest said mandrel and disposed for cooperatively engaging said axial grooves; spring means seated in said barrel and abutting the other end of said sleeve to bias said sleeve toward said mandrel, said sleeve being free to move axially in said barrel against the bias of said spring means upon axial engagement of said key appendages with said mandrel adjacent said axial grooves; and means engaging said key sleeve and preventing relative rotation between sleeve and barrel.

3. In a joint for coupling pipe sections and the like; a tubular barrel provided with camming lugs on its inner cylindrical surface; a tubular mandrel having a camming recess formed on its outer cylindrical surface for receiving and guiding said lugs in a helical path about said mandrel, said mandrel also having axial grooves connecting with said camming recess; a tubular key sleeve mounted in said barrel for relative axial movement, said key sleeve provided with key appendages extending axially from the end of said sleeve nearest said mandrel and disposed for cooperatively engaging said axial grooves; spring means seated in said barrel and abutting the other end of said sleeve to bias said sleeve toward said mandrel, said sleeve being free to move axially in said barrel against the bias of said spring means upon axial engagement of said key appendages with said mandrel adjacent said axial grooves; and means engaging said key sleeve and preventing relative rotation between sleeve and barrel.

4. In a joint for coupling pipe sections and the like, a tubular mandrel having axial grooves intersecting camming recesses formed therein; a tubular barrel provided with camming lugs disposed on its inner cylindrical surface for axial alignment with said axial grooves, said lugs having camming surfaces for cooperatively engaging surfaces of said camming recesses; a tubular key sleeve mounted in said barrel, said key sleeve provided with key appendages extending axially from the end of said sleeve nearest said mandrel and disposed for cooperatively engaging said axial grooves; spring means seated in said barrel and abutting the other end of said sleeve to bias said sleeve toward said mandrel, said sleeve being free to move axially in said barrel against the bias of said spring means upon axial engagement of said key appendages with said mandrel adjacent said axial grooves; and means engaging said key sleeve and preventing rotation of said sleeve in said barrel but permitting relative axial movement therebetween.

5. In a joint for coupling pipe sections and the like, a tubular mandrel comprising a base and an extension sleeve of lesser diameter, said base having a plurality of axial grooves circumferentially and symmetrically disposed on the outer surface thereof, and also having a plurality of camming recesses connecting with said axial grooves and disposed with a helical incline about said base and away from said extension sleeve; a tubular barrel provided with lugs circumferentially and symmetrically disposed on its inner surface for axial alignment with said axial grooves, said lugs being helically shaped and having camming surfaces for cooperatively engaging surfaces of said camming recesses; a tubular key sleeve mounted in said barrel, said key sleeve provided with key appendages extending axially from the end of said sleeve nearest said base and circumferentially and symmetrically disposed for cooperatively engaging said axial grooves; spring means seated in said barrel and abutting the other end of said sleeve to bias said sleeve toward said mandrel, said sleeve being free to move axially in said barrel against the bias of said spring means upon axial engagement of said key appendages with said mandrel adjacent said axial grooves; and means engaging said key sleeve and preventing rotation of said sleeve in said barrel but permitting relative axial movement therebetween.

6. In a joint for coupling pipe sections and the like, a tubular mandrel comprising a base and an extension sleeve of lesser diameter meeting at a shoulder, said base having helical camming recesses formed therein, said recesses beginning from an opening at said shoulder and terminating with less than one convolution, said base also having axial grooves formed therein, said grooves beginning from an opening at said shoulder and connecting with said recesses; a tubular barrel provided with lugs on its inner surface, said lugs being circumferentially disposed for simultaneous engagement of said camming recesses; a tubular key sleeve mounted in said barrel for relative axial movement, said key sleeve provided with key appendages extending axially from the end of said sleeve nearest said mandrel and disposed for cooperatively engaging said axial grooves; spring means seated in said barrel and abutting the other end of said sleeve to bias said sleeve toward said mandrel, said sleeve being free to move axially in said barrel against the bias of said spring means upon axial engagement of said key appendages with said mandrel adjacent said axial grooves; and means engaging said key sleeve and preventing relative rotation between sleeve and barrel.

7. In a joint for coupling pipe sections and the like, a tubular mandrel comprising a base and an extension sleeve of lesser diameter, said base having axial grooves intersecting helical camming recesses formed therein; a tubular barrel having an inner reduced conduit portion, an inner conduit sleeve coaxial with said barrel and having one end connected at said reduced conduit portion, helically shaped lugs disposed on the inner surface of said barrel for axial alignment with said axial grooves, said lugs having camming surfaces for cooperatively engaging surfaces of said camming recesses; a tubular key sleeve mounted in said barrel between said lugs and said reduced portion and having one end coaxially receive the other end of said inner conduit sleeve, said key sleeve provided with key appendages extending axially from the end of said sleeve nearest said base and disposed for cooperatively engaging said axial grooves, sealing means circumferentially disposed on the inner surface and at either end of said key sleeve for contacting the outer respective surfaces of said inner conduit sleeve and said extension sleeve; spring means seated in said barrel and abutting the other end of said sleeve to bias said sleeve toward said mandrel, said sleeve being free to move axially in said barrel against the bias of said spring means upon axial engagement of said key appendage with said mandrel adjacent said axial grooves; and means engaging said key sleeve and preventing rotation of said sleeve in said barrel but permitting relative axial movement therebetween.

8. In a joint for coupling pipe sections and the like, a tubular mandrel comprising a base and an extension sleeve of lesser diameter, said base having axial grooves intersecting helical camming recesses formed therein; a tubular barrel having an inner reduced conduit portion, an inner conduit sleeve coaxial with said barrel and having one end connected at said reduced conduit portion, helically shaped lugs disposed on the inner surface of said barrel for axial alignment with said axial grooves, said lugs having camming surfaces for cooperatively engaging surfaces of said camming recesses; a tubular key sleeve mounted in said barrel between said lugs and said reduced portion and having one end coaxially receive the other end of said inner conduit sleeve, said key sleeve provided with key appendages extending axially from the end of said sleeve nearest said base and disposed for cooperatively engaging said axial grooves, spring means seated in said barrel and abutting the other end of said sleeve to bias said sleeve toward said mandrel, said sleeve being free to move axially in said barrel against the bias of said spring upon engagment of said key appendages with said mandrel adjacent said axial grooves, sealing means circumferentially disposed on the inner surface and at either end of said key sleeve for contacting the outer respective surfaces of said inner conduit sleeve and said extension sleeve; catch means formed on the inner surface of said key sleeve for engaging a tool and permitting retraction of said sleeve; and means engaging said key sleeve and preventing rotation of said sleeve in said barrel but permitting relative axial movement therebetween.

9. In a safety joint a barrel, a mandrel having a cylindrical surface on one end portion thereof telescopically positioned within one end of said barrel, a cylindrical extension on the said end of said mandrel of smaller external diameter than said cylindrical surface and joined to said surface by a shoulder, a helical channel in said cylindrical surface open at said shoulder and extending from said shoulder along said cylindrical surface and terminating on said cylindrical surface, a driving lug extending inwardly from the inner surface of said barrel and engaging said helical channel in sliding contact when said barrel and mandrel are telescoped together and operating automatically to rotate said barrel relative to said mandrel to place said driving lug at the terminus of said helical channel, a keyway formed in said cylindrical surface and disposed transversely of said helical channel, said keyway having an open end at said shoulder to receive a key, a key proportioned to be received in said keyway and means to maintain the lower end of said key above the lower end of said driving lug, means biasing said key continuously in an axial direction toward said mandrel and into contact with said shoulder as said driving lug engages said helical channel, said key proportioned to engage said shoulder and slide circumferentially thereon as said driving lug and said helical channel cooperate to rotate said barrel relative to said mandrel, the said open end of said keyway being disposed on said shoulder to receive said key at the time said driving lug abuts the terminus of said helical channel to thereby secure said driving lug at said terminus, said biasing means operating automatically to project said key into said keyway when the safety joint is fully engaged.

10. A safety joint comprising a hollow cylindrical outer member, a collar connected to one end of said outer member and having a circumferential portion extending radially inwardly thereof, a substantially cylindrical inner member having one end detachably telescoped within the other end of said outer member, a helical channel formed in the circumferential surface of said inner member, an entrance for said helical channel at a transversely disposed surface of said inner member, said helical channel progressing continuously along the circumferential surface of said inner member from said entrance and terminating at an axially disposed surface formed in the body of said inner member, an axially disposed keyway formed in the circumferential surface of said inner member and positioned across said helical channel, an entrance for said keyway at said transversely disposed surface, a driving lug projecting radially inwardly from the interior surface of said outer member and slidably received by said helical channel to rotate said outer member automatically relative to said inner member upon the application of axial force between said inner member and said outer member, a cylindrical sleeve disposed concentrically within said outer member and affixed at one end to said collar and extending axially toward the said other end of said outer member, said sleeve being proportioned with an external diameter less than the internal diameter of said outer member to define an annular chamber between said sleeve and the inner walls of said outer mmeber, a locking sleeve slidably mounted within said outer member with one end thereof disposed within said annular chamber, a helical spring disposed within said annular chamber and engaged between said collar and the said one end of said locking sleeve to bias said locking sleeve toward the said other end of said outer member, means to retain said locking sleeve within said outer member while permitting axial movement thereof, a unitary locking key projecting from the other end of said locking sleeve and said means maintaining the lower end of said locking key above the lower end of said driving lug, said locking key being proportioned to engage said transversely disposed surface of said inner member through the action of said helical spring when said inner member and said outer member are telescoped together and to slide circumferentially on said transversely disposed surface as said inner member and said outer member relatively rotate through the interaction of said driving lug and said helical channel, said entrance for said keyway being positioned on said transversely disposed surface to receive said locking key when said driving lug reaches the terminus of said helical channel to dispose said locking key in a position abutting said driving lug to thereby lock said outer member to said inner member while preventing relative rotary motion between the parts, axially aligned passageways through said inner member, said locking sleeve, said cylindrical sleeve and said collar, and resilient fluid-tight packing means disposed between said locking sleeve and said cylindrical sleeve and between said locking sleeve and the interconnected said inner member to prevent leakage of fluids from the assembled safety joint.

11. In a safety joint a barrel, a mandrel having a cylindrical surface on one end portion thereof telescopically positioned within one end of said barrel, a cylindrical extension on the said end of said mandrel of smaller external diameter than said cylindrical surface and joined to said surface by a shoulder, a helical channel in said cylindrical surface open at said shoulder and extending from said shoulder along said cylindrical surface and terminating on said cylindrical surface, a driving lug extending inwardly from the inner surface of said barrel and engaging said channel in sliding contact when said barrel and mandrel are telescoped together to cause automatic relative rotation of said barrel with respect to said mandrel, a keyway formed transversely of said channel and extending from an opening at said shoulder and substantially across said channel, a complementary locking key proportioned to engage said keyway, means to maintain the lower end of said locking key above the lower end of said driving lug, said locking key being biased toward said mandrel to engage said shoulder in sliding contact as said barrel rotates relative to said mandrel and to slide into said keyway when said driving lug is at the terminus of said channel to lock said driving lug in said channel, and means to withdraw said locking key from said keyway to permit said driving lug to be disengaged from said channel.

12. In a safety joint a barrel, a mandrel having a cylindrical surface on one end portion thereof telescopically positioned within one end of said barrel, a cylindrical extension on the said end of said mandrel of smaller external diameter than said cylindrical surface and joined to said surface by a shoulder, a plurality of helical channels formed in said cylindrical surface in circumferentially spaced apart relationship, each of said channels open at said shoulder and extending continuously from said shoulder along said cylindrical surface and terminating on said cylindrical surface in a respective radially disposed axially aligned surface, a plurality of driving lugs extending inwardly from the inner surface of said barrel in circumferentially spaced relationship corresponding to the said spaced relationship of said channels, each of said driving lugs engaging a corresponding one of said channels in sliding contact when said barrel and said mandrel are telescoped together to rotate said barrel relative to said mandrel automatically and place said driving lugs at the termini of the respective channels, a respective axially disposed keyway formed in said cylindrical surface across each of said helical channels and open at said shoulder, a complementary locking key for each of said keyway, means to maintain the lower end of each said complementary locking key above the lower ends of said driving lugs, said complementary locking key engaging said shoulder under spring pressure and sliding on said shoulder in a relative circumferential direction as said driving lugs slide along their respective helical channels and automatically entering its respective keyway under the force of said spring pressure when said driving lugs abut the termini of their respective helical channels to thereby lock said driving lugs securely at said termini.

13. In a joint for coupling pipes and the like comprising first and second conduit sections having telescopically connectible end portions, said first conduit section having a cam recess therein open toward the end of said conduit section and extending helically from said end, said second conduit section including a cam lug thereon for insertion into the open end of said cam recess and movable therealong to an inserted position therein upon combined axial telescoping and relative rotation of said conduit sections, said cam recess and cam lug having interengaging surfaces to prevent direct axial separation of said conduit sections when said cam lug is in said inserted position, a locking surface on one of said conduit sections, a key, means mounting said key on the other of said conduit sections for movement of said key relative to said other of said conduit sections between a first position wherein said key engages said locking surface to restrain relative rotation between said conduit sections in a direction wherein said cam lug will move in said cam recess toward the open end of said cam recess when said cam lug is in its inserted position, and a second position wherein said key is out of engagement with said locking surface wherein relative rotation of said conduit sections may occur, spring means directly engaged with said key for moving said key from its second to its first position when said cam lug is in said inserted position in said cam recess, said sleeve being free to move from its first to its second position against the bias of said spring during movement of said cam lug into said cam recess and toward said inserted position therein.

References Cited in the file of this patent

UNITED STATES PATENTS

| | | |
|---|---|---|
| 672,154 | Taylor | Apr. 16, 1901 |
| 980,677 | Rhoads | Jan. 3, 1911 |
| 1,039,536 | Hill | Sept. 24, 1912 |
| 1,673,338 | Mitchell | June 12, 1928 |
| 1,761,352 | Logan | June 3, 1930 |
| 2,039,945 | Wickersham et al. | May 5, 1936 |
| 2,049,290 | Burns et al. | July 28, 1936 |
| 2,118,350 | Holt | May 24, 1938 |
| 2,202,261 | Osmun | May 28, 1940 |
| 2,210,815 | Linney | Aug. 6, 1940 |
| 2,662,276 | Sheaffer | Dec. 15, 1953 |
| 2,836,247 | McCulloch | May 27, 1958 |
| 2,851,252 | Le Bus | Sept. 9, 1958 |
| 2,852,231 | Le Bus | Sept. 16, 1958 |
| 2,950,929 | Nicolson | Aug. 30, 1960 |